(12) United States Patent
Lee et al.

(10) Patent No.: US 11,735,146 B2
(45) Date of Patent: Aug. 22, 2023

(54) ELECTRONIC DEVICE AND METHOD FOR CONTROLLING DISPLAY USING OPTICAL SENSOR

(71) Applicant: SAMSUNG ELECTRONICS CO., LTD., Suwon-si (KR)

(72) Inventors: Donghan Lee, Suwon-si (KR); Jongjin Kim, Suwon-si (KR); Jongah Kim, Suwon-si (KR); Heewoong Yoon, Suwon-si (KR); Jeongho Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 48 days.

(21) Appl. No.: 16/953,815

(22) Filed: Nov. 20, 2020

(65) Prior Publication Data
US 2021/0158782 A1 May 27, 2021

(30) Foreign Application Priority Data
Nov. 22, 2019 (KR) .................. 10-2019-0151566

(51) Int. Cl.
*G09G 5/38* (2006.01)
*G09G 5/10* (2006.01)
*G01J 1/44* (2006.01)
*G01C 3/08* (2006.01)
(Continued)

(52) U.S. Cl.
CPC .............. *G09G 5/38* (2013.01); *G01C 3/08* (2013.01); *G01J 1/44* (2013.01); *G06V 40/1318* (2022.01); *G06V 40/67* (2022.01); *G09G 5/10* (2013.01); *G09G 2320/0646* (2013.01); *G09G 2320/103* (2013.01); *G09G 2340/0464* (2013.01); *G09G 2340/14* (2013.01); *G09G 2360/144* (2013.01); *G09G 2360/145* (2013.01)

(58) Field of Classification Search
CPC .... G09G 5/38; G09G 5/10; G09G 2320/0646; G09G 2320/103; G09G 2340/0464; G09G 2360/145; G01C 3/08; G06V 40/1318
See application file for complete search history.

(56) References Cited

U.S. PATENT DOCUMENTS

| 9,466,653 | B2 | 10/2016 | de Jong et al. | |
|---|---|---|---|---|
| 11,227,544 | B2 * | 1/2022 | Yang | G09G 3/3233 |
| 11,244,995 | B2 * | 2/2022 | Cho | G09G 3/3225 |

(Continued)

FOREIGN PATENT DOCUMENTS

KR 10-2019-0026128 3/2019

*Primary Examiner* — Antonio A Caschera
(74) *Attorney, Agent, or Firm* — Nixon & Vanderhye, P.C.

(57) ABSTRACT

According to an embodiment, an electronic device may include: a display, an optical sensor disposed in a rear surface of the display and overlapping the display, the optical sensor including a light emitting unit including light emitting circuitry and a light receiving unit including light receiving circuitry, a processor operatively connected with the display and the optical sensor, and a memory operatively connected with the processor, wherein the memory may store instructions which, when executed, cause the processor to: obtain position information of a first area corresponding to the light emitting unit of the optical sensor in the display, and based on the light emitting unit of the optical sensor radiating light, output a visual object in the first area and/or an area adjacent to the first area on the display.

20 Claims, 12 Drawing Sheets

(51) Int. Cl.
*G06V 40/60* (2022.01)
*G06V 40/13* (2022.01)

(56) References Cited

U.S. PATENT DOCUMENTS

| | | | |
|---|---|---|---|
| 2006/0033016 A1* | 2/2006 | Ogawa | G06F 3/0421 250/221 |
| 2010/0177046 A1* | 7/2010 | Shin | G06F 3/0421 345/169 |
| 2018/0074627 A1 | 3/2018 | Kong et al. | |

* cited by examiner

ELECTRONIC DEVICE AND METHOD FOR CONTROLLING DISPLAY USING OPTICAL SENSOR

CROSS-REFERENCE TO RELATED APPLICATION

This application is based on and claims priority under 35 U.S.C. § 119 to Korean Patent Application No. 10-2019-0151566, filed on Nov. 22, 2019, in the Korean Intellectual Property Office, the disclosure of which is incorporated by reference herein in its entirety.

BACKGROUND

Field

The disclosure relates to an electronic device and a method for controlling a display using an optical sensor.

Description of Related Art

An electronic device may perform various functions in a complex manner. For example, a mobile communication terminal, a personal digital assistance (PDA), an electronic organizer, a smart phone, and a tablet personal computer (PC) are evolving to realize advanced performance and to provide a user with more convenience.

The electronic device may use a sensor to provide the various functions. Such a sensor may collect information related to the electronic device, outside of the electronic device, or the user. The electronic device may include one or more sensors, and provide various services by collecting information using various sensors.

An electronic device including a display may include sensors disposed in a front surface including the display. For example, the front surface of the electronic device may include a light sensor for detecting an ambient light amount of the electronic device to adjust brightness of the display, a proximity sensor for detecting contact of the electronic device and the user, and a fingerprint sensor for recognizing a user's fingerprint. Those sensors are disposed not to overlap the display in a conventional electronic device, and size increase of the display is limited by spaces occupied by the sensors.

To increase the display size of the electronic device, various sensors may be disposed in a rear surface of the display to overlap the display. If an optical sensor including a light emitting unit is disposed in the rear surface of the display, light from the light emitting unit of the optical sensor may reach some pixels of the display, to cause distortion in light emitted by the corresponding pixels. Such distortion may be displayed in the form of a small dot (hereafter, a 'spot') on the display while the optical sensor operates. Such a spot may cause the user of the electronic device to recognize a problem in the display, to degrade usability of the electronic device.

Since the position of the sensor may differ in each electronic device due to variation in sensor designing or mounting of the electronic device, the electronic device may not provide accurate visual object related to the position of the optical sensor.

SUMMARY

Embodiments of the disclosure may provide an electronic device for accurately identifying a position of an optical sensor disposed in a rear a surface of a display, and displaying a visual object related to an operation of the optical sensor at a corresponding position.

According to an example embodiment, an electronic device may include: a display, an optical sensor disposed in a rear surface of the display and overlapping the display, the optical sensor including a light emitting unit including light emitting circuitry and a light receiving unit including light receiving circuitry, a processor operatively connected with the display and the optical sensor, and a memory operatively connected with the processor, wherein the memory may store instructions which, when executed, cause the processor to: obtain position information of a first area corresponding to the light emitting unit of the optical sensor in the display, and based on the light emitting unit of the optical sensor radiating light, output a visual object in the first area and/or an area adjacent to the first area on the display.

According to an example embodiment, an electronic device may include: a display, a proximity sensor disposed in a rear surface of the display and overlapping the display, the proximity sensor including a light emitting unit including light emitting circuitry and a light receiving unit including light receiving circuitry, a processor operatively connected with the display and the proximity sensor, and a memory operatively connected with the processor, wherein the memory may store instructions which, when executed, cause the processor to: based on the light emitting unit of the proximity sensor radiating light, output a visual object in a first area and/or an area adjacent to the first area on the display.

According to an example embodiment, a method of controlling an electronic device including a display and an optical sensor may include: obtaining position information of a first area corresponding to a light emitting unit of the optical sensor in the display, and based on the light emitting unit of the optical sensor radiating light, outputting a visual object in the first area and/or an area adjacent to the first area on the display.

Other aspects, advantages, and salient features of the disclosure will become apparent to those skilled in the art from the following detailed description, which, taken in conjunction with the annexed drawings, discloses various example embodiments of the disclosure.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

Throughout the drawings, like reference numerals will be understood to refer to like parts, components and structures.

DETAILED DESCRIPTION

Figure 1:
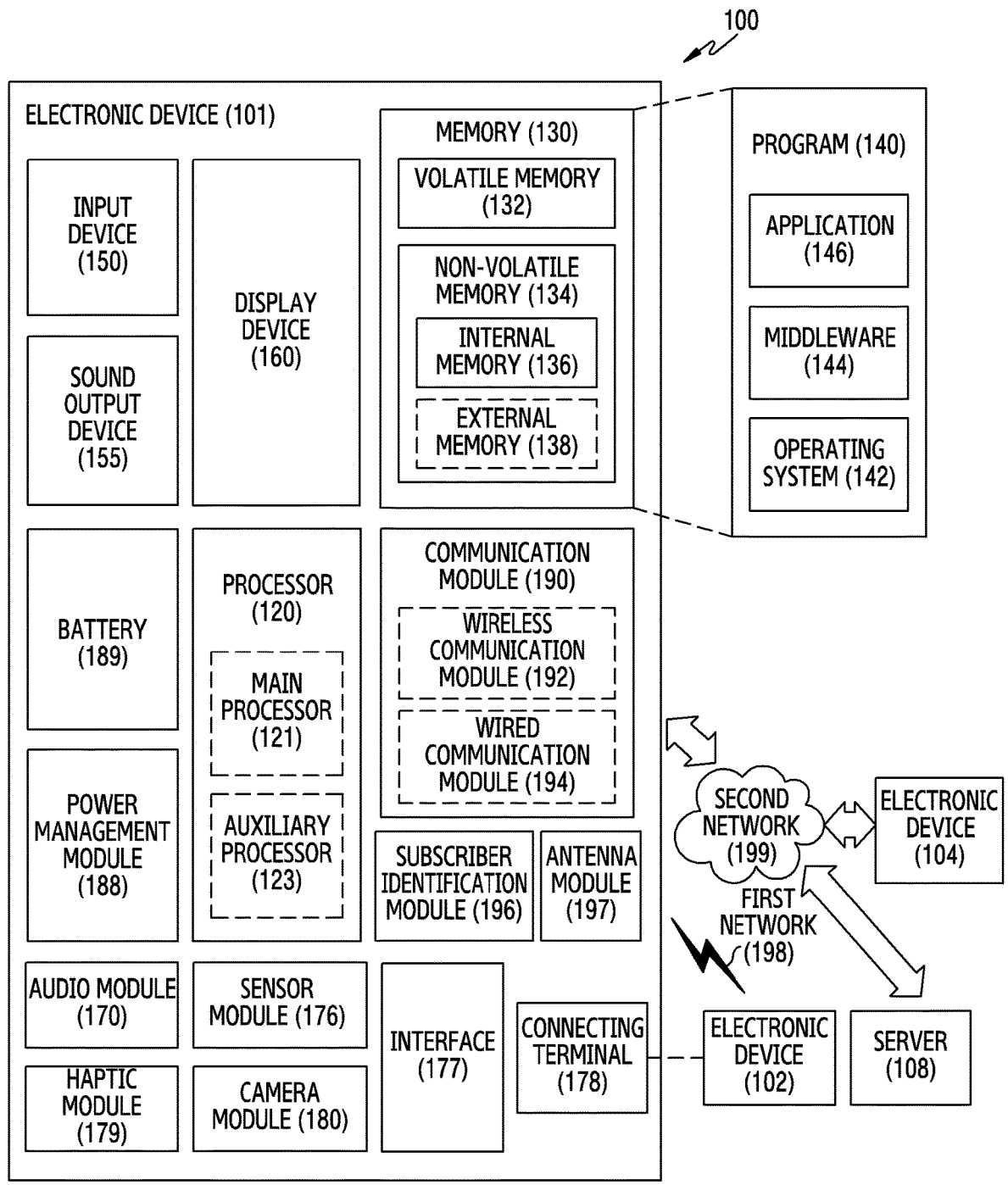
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
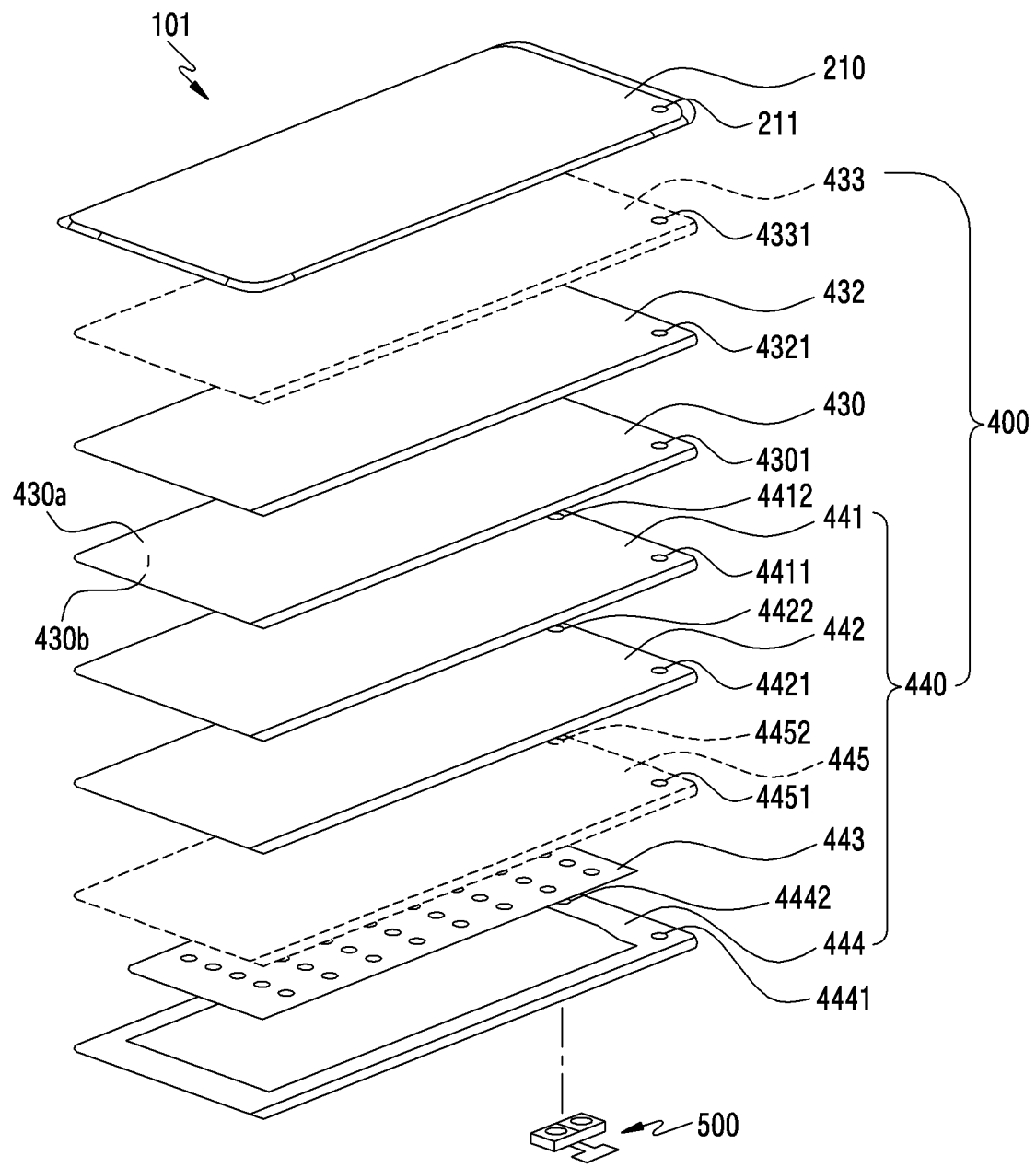
FIG. 2 is an exploded perspective view illustrating an example display in an electronic device according to various embodiments.

FIG. 2 is an exploded perspective view illustrating an example display (e.g., the display device 160 of FIG. 1) in an electronic device (e.g., the electronic device 101 of FIG. 1) according to various embodiments.

Referring to FIG. 2, a display 400 may include a polarizer (POL) 432 (e.g., a polarizing film) disposed on a rear surface of a front cover 210 (e.g., a front plate, a glass plate or a cover member) using an adhesive member, a display panel 430 disposed on a rear surface of the POL 432 and at least one subsidiary material layer 440 attached to a rear surface 430*b* of the display panel 430. According to an embodiment, the POL 432 may be attached to a front surface 430*a* of the display panel 430. According to an embodiment, the adhesive member may include an optical clear adhesive (OCA), a pressure sensitive adhesive (PSA), a heat sensitive adhesive, a general adhesive or a double-sided tape.

According to an embodiment, the front cover 210 may be disposed on a front surface of the display 400 to protect the display 400 from an external impact. To protect the display 400, the front cover 210 may include a hard material, compared with the display 400. The front cover 210 may include a camera exposure area 211 disposed at a position corresponding to a camera module. According to an embodiment, the camera exposure area 211 may be determined by a print area (e.g., a black matrix (BM) area) disposed to surround it. According to an embodiment, a size or a shape of the print area may be determined by an angle of view of the camera module. According to an embodiment, the front cover 210 may include only the camera exposure area 211, without a separate print area.

According to an embodiment, the display panel 430, which is a screen display device of the electronic device, may receive a signal from a processor of the electronic device and output an image. According to an embodiment, the display panel 430 itself may emit light without a back light. The display panel 430 may include, for example, an organic LED (OLED) and a quantum-dot LED (QLED).

According to an embodiment, the display panel 430 and the POL 432 may be integrally formed. According to an embodiment, the display 400 may further include a touch panel 433. According to an embodiment, the display 400 may operate as an in-cell or on-cell touch display according to a position of the touch panel 433. For example, the display 400 may include a fingerprint sensor (not shown) which operates through the display panel 430. According to an embodiment, the fingerprint sensor may include an ultrasonic or optical fingerprint sensor for scanning a fingerprint of a finger which touches or approaches an outer surface of the front cover 210 through a hole formed at least partially in some of the components of the display 400.

According to an embodiment, the at least one subsidiary material layer 440 may include at least one polymer member 441 and 442 disposed on the rear surface of the display panel 430, at least one functional member 443 disposed on a rear surface of the at least one polymer member 441 and 442 and a conductive member 440 disposed on a rear surface of the at least one functional member 443. According to an embodiment, the at least one polymer member 441 and 442 may include an embossing layer 441 for removing air bubbles between the display panel 430 and its materials attached below it and/or a cushion layer 430 disposed for softening the impact. According to an embodiment, the at least one functional member 443 may include a graphite sheet for heat dissipation, an added display, a force touch FPCB, a fingerprint sensor FPCB, a communication antenna radiator, a heat dissipation sheet, a conductive tape, a non-conductive tape or an open cell sponge. According to an embodiment, the conductive member 444, which is a metallic material, may be used to reinforce hardness of the electronic device, to shield ambient noise, and to disperse heat emitted from a peripheral heat-emitting component. According to an embodiment, the conductive member 444 may include Cu, Al, SUS or CLAD (e.g., a layered member by alternating SUS and Al). According to an embodiment, the display 400 may further include a detection member 445 for detecting an input of an electromagnetic inductive writing member (e.g., a digital pen). According to an embodiment, the detection member 445 may include a digitizer. According to an embodiment, the detection member 445 may be disposed between the at least one polymer member 442 and the functional member 443. According another an embodiment, the detection member 445 may be disposed between the display panel 430 and the at least one polymer member 441.

According to various embodiments, the front cover 210 may include, when viewed from above the front cover 210, the camera exposure area 211 formed at least partially in the area overlapped with the display panel 430. According to an embodiment, when viewed from above the front cover 210, the display panel 430 may include an opening 4301 formed in an area overlapped with the camera exposure area 211. According to an embodiment, the POL 432 and/or the touch panel 433 attached to the display panel 430 may also include openings 4321 and 4331 formed at the corresponding position. According to an embodiment, when viewed from above the front cover 210, the at least one subsidiary material layer 440 may also include openings 4411, 4421, 4441, and 4451 formed at the position corresponding to the opening 4301.

According to an embodiment, the electronic device (e.g., the electronic device 101 of FIG. 1) may include an optical sensor module 500 attached to the rear surface of the display 400. According to an embodiment, the optical sensor module 500 may include various sensor modules for detecting an external environment by detecting light emitted through the display 400 and reflected by an external object. According to an embodiment, the optical sensor module 500 may include at least one of a camera module, an ultra violet (UV) sensor module, an iris sensor module, a spectroscopic sensor, an infrared sensor, an RGB sensor, a time of flight (TOF) sensor module, a proximity sensor, a gesture sensor or an ambient light sensor.

The optical sensor module 500 may include a light emitting unit for emitting the light and/or a light receiving unit for gathering external light. A light emitting element may be an LED or a LD, and a plurality of light emitting unit elements may be configured, or a plurality of elements of different wavelengths may be disposed. Alternatively, a single element may output the light by changing the wavelength. A light receiving unit element of the optical sensor module 500 may use an element which converting the light to an electrical signal, such as a photo diode or a camera.

According to various embodiments, the optical sensor module 500 may emit the light through the display panel 430 and receive the light radiated from outside, but the light may not permeate through the subsidiary material layer 440. Hence, the subsidiary material layer 440 may include at least one through holes 4412, 4422, 4442, and 4452 formed at a corresponding position, to receive the light emitted from the optical sensor module 500 disposed therebelow and received from the outside. According to an embodiment, if the optical sensor module 500 may be a camera sensor module or a TOF module, the display panel 430 and the POL 432 may also include a through hole at the corresponding position.

Figure 3:
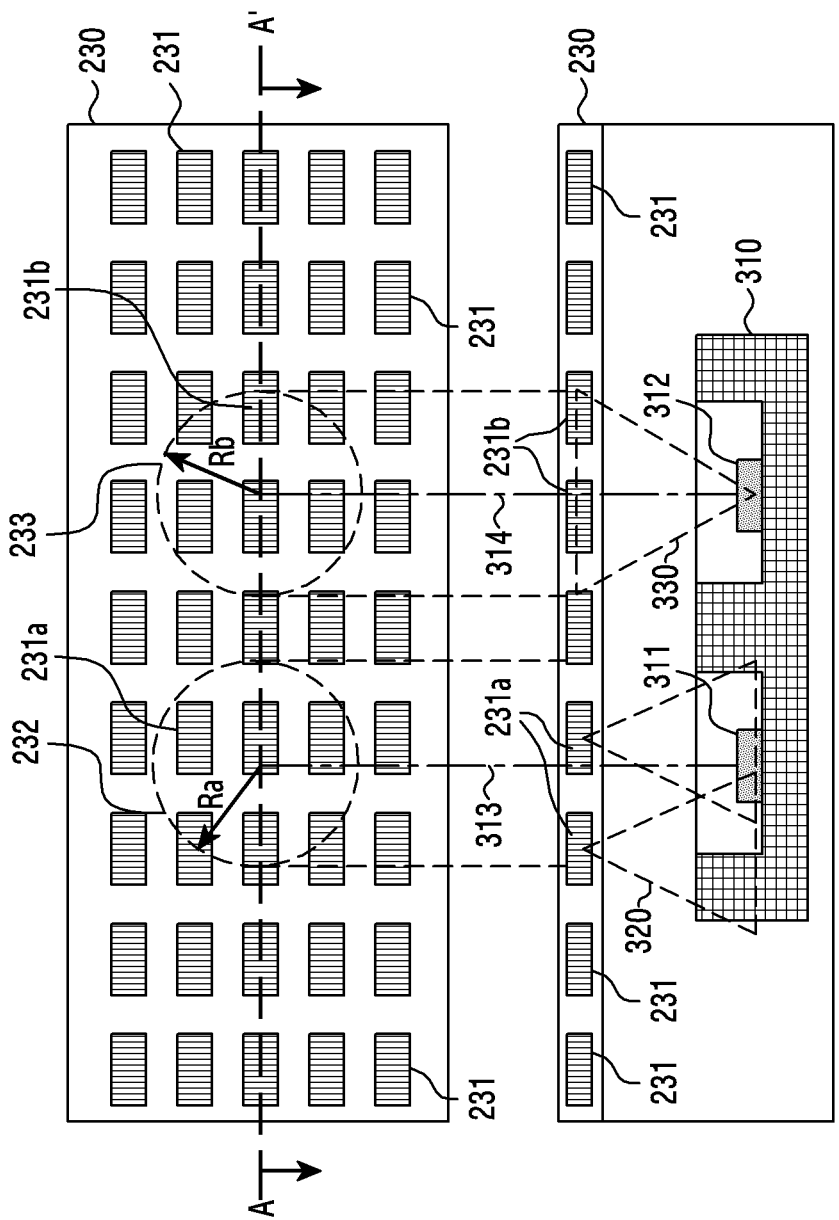
FIG. 3 is a diagram illustrating an example optical sensor disposed in a rear surface of a display in an electronic device according to various embodiments.

FIG. 3 is a diagram illustrating an example optical sensor (e.g., the optical sensor module 500 of FIG. 2) disposed in a rear surface of a display (e.g., the display 400 of FIG. 2) in an electronic device (e.g., the electronic device 101 of FIG. 1) according to various embodiments. For example, FIG. 3 illustrates a top view of the electronic device (e.g., the electronic device 101 of FIG. 1) including a display 230 and an optical sensor 310 and a cross-sectional view A-A' of the corresponding electronic device.

According to an embodiment, the electronic device may include the display 230 and the optical sensor 310 disposed below the display 230. Although not depicted, the electronic device may include a processor (e.g., the processor 120 of FIG. 1) electrically connected to the display 230 and the optical sensor 310, and a memory (e.g., the memory 230 of FIG. 1) electrically connected to the processor.

According to an embodiment, the display 230 may include a plurality of pixels 231. The processor may control a brightness and/or a color of the light emitted by the plurality of the pixels 231.

According to an embodiment, the optical sensor 310 may include a light receiving unit (e.g., including light receiving circuitry) 311 and/or a light emitting unit (e.g., including light emitting circuitry) 312. The processor may include various processing circuitry and detect a brightness change of a light 320 acquired at the light receiving unit 311 through the light receiving unit 311 of the optical sensor 310. If the processor activates the light emitting unit 312 of the optical sensor 310, the light emitting unit 312 may emit a light 330. The light 330 emitted from the light emitting unit 312 may be radiated to the outside of the electronic device through the display 230.

According to an embodiment, the display 230 may include an area (hereafter, referred to as a 'light receiving unit area 232') corresponding to the light receiving unit 311 of the optical sensor 310 and an area (hereafter, referred to as a 'light emitting unit area 233') corresponding to the light emitting unit 312 of the optical sensor 310.

According to an embodiment, at least one pixel 231a of the pixels 231 of the display 230 may correspond to the light receiving unit area 232. The light receiving unit area 232 may correspond to an area within a specific radius Ra from a center axis 313 of the light receiving unit 311 of the optical sensor 310 in the display 230.

According to an embodiment, the light 320 emitted by the at least one pixel 231a corresponding to the light receiving unit area 232 may affect an electrical signal generated by the light receiving unit 311 of the optical sensor 310. For example, if the brightness of the light emitted by the pixel 231a of the light receiving unit area 232 changes, the processor may detect the brightness change of the light receiving unit area 232 through the light receiving unit 311 of the optical sensor 310.

According to an embodiment, the light emitting unit area 233 may correspond to an area passed by the light emitted by the light emitting unit 312 of the optical sensor 310 in the display 230. According to an embodiment, the light emitting unit area 233 may correspond to an area within a specific radius Rb from a center axis 314 of the light emitting unit 312 of the optical sensor 310 in the display 230.

According to an embodiment, at least one pixel 231b of the pixels 231 of the display 230 may correspond to the light emitting unit area 233. The at least one pixel 231b corresponding to the light emitting unit area 233 may be affected by the light 330 radiated from the light emitting unit 312. That is, the light radiated by the at least one pixel 231b corresponding to the light emitting unit area 233 may be distorted by the light 330 emitted from the light emitting unit 312. For example, even if the processor instructs a first pixel of the light emitting unit area 233 to output a first color, a light color radiated by the first pixel may be different from the first color due to the light radiated from the light emitting unit 312 of the optical sensor 310. Since the light radiated by some pixel of the display 230 is distorted by the light 330 emitted from the light emitting unit 312, an unintended spot may occur in the light emitting unit area 233 of the display 230.

Figure 4A:
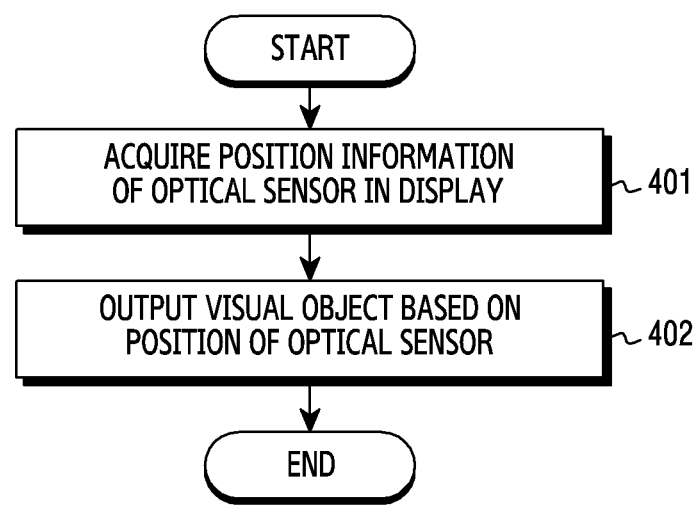
FIG. 4A is a flowchart illustrating an example method of outputting a visual object in an area adjacent to a light emitting unit area of an optical sensor in a display of an electronic device according to various embodiments.
Figure 4B:
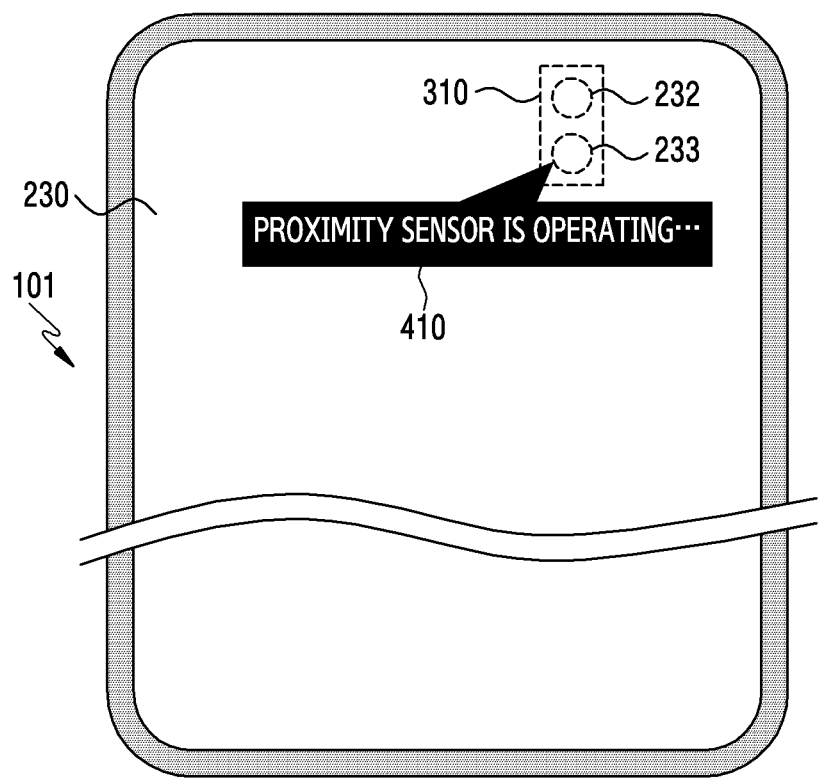
FIG. 4B is a diagram illustrating an example of the visual object output on the display of the electronic device according to various embodiments.
Figure 4C:
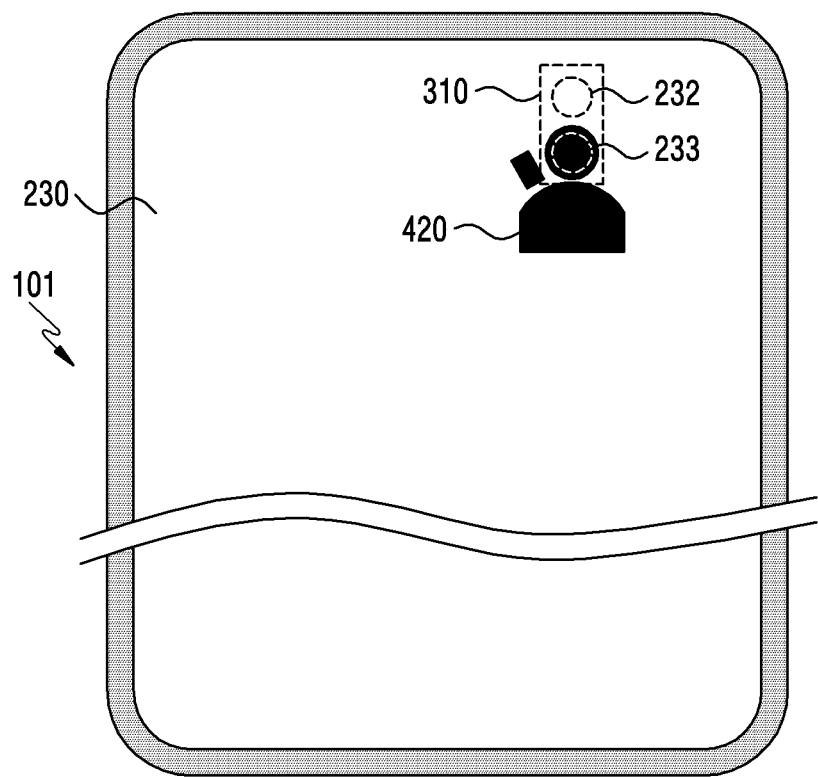
FIG. 4C is a diagram illustrating an example of the visual object output on the display of the electronic device according to various embodiments.

FIG. 4A is a flowchart illustrating an example method for outputting a visual object in an area adjacent to a light emitting unit area 233 of an optical sensor 310 in a display 230 of an electronic device (e.g., the electronic device 101 of FIG. 1) according to various embodiments. FIG. 4B and FIG. 4C are diagrams illustrating examples of the visual object output on the display 230 of the electronic device (e.g., the electronic device 101 of FIG. 1) according to various embodiments. The following descriptions may be provided with reference to FIG. 3.

According to an embodiment, a processor (e.g., the processor 120 of FIG. 1) may acquire information related to a position (hereafter, 'position information') of the optical sensor 310 in operation 401. In an embodiment, the position information of the optical sensor 310 may be position information of an area corresponding to the optical sensor 310 in the display 230. In an embodiment, the position information of the area corresponding to the optical sensor 310 in the display 230 may include coordinates of the corresponding area or pixels in the corresponding area.

In an embodiment, the processor may acquire position information of the light receiving unit 311 or the light emitting unit 312 of the optical sensor 310. In an embodiment, the processor may acquire position information of an area (hereafter, the light receiving unit area 232) corresponding to the light receiving unit 311 of the optical sensor 310 or an area (hereafter, the light emitting unit area 233) corresponding to the light emitting unit 312. In an embodiment, the light receiving unit area 232 and/or the light emitting unit area 233 may include one or more pixels, and the position information of the light receiving unit area 232 and/or the light emitting unit area 233 may include coordinates indicating where the one or more pixels are disposed in the display 230. In an embodiment, the position information of the light receiving unit area 232 if the light receiving unit area 232 includes a first pixel group may include coordinates of the first pixel group on the display 230. The position information of the light emitting unit area 233 if the light emitting unit area 233 includes a second pixel group may include coordinates of the second pixel group on the display 230. In an embodiment, the processor may identify the position of the optical sensor 310 by outputting a moving image, which shall be elucidated in FIG. 6.

In operation 402, the processor may output an image (e.g., a visual object) on the display based on the position information of the optical sensor 310. According to an embodiment, the processor may output a visual object (or an image, a user interface) on the display 230 based on the position information of the optical sensor 310 while the optical sensor 310 operates, in operation 402. In an embodiment, the processor may determine a position for displaying the visual object related to the operation of the optical sensor 310 on the display 230, based on the position information of the optical sensor 310. In an embodiment, the processor may determine the position of the visual object based on the coordinates of the optical sensor 310. In an embodiment, the processor may determine the position of the visual object based on the coordinates of the light emitting unit 312 (or the light receiving unit 311) of the optical sensor 310. By outputting the visual object in the area 233 corresponding to the light emitting unit 312 of the optical sensor 310 in the display 230, the processor may minimize usability degradation due to the display distortion.

According to an embodiment, the processor may display a visual object on the display 230 based on whether the optical sensor 310 operates. The processor may output the visual object at least while the light emitting unit 312 of the optical sensor 310 operates. According to an embodiment, the optical sensor 310 may operate while the display 230 enables always on display (AOD), and the processor may display the visual object in the light emitting unit area 233 based on the operation of the optical sensor 310.

According to an embodiment, the processor may output a visual object in the light emitting unit area 233 and/or in an area adjacent to the light emitting unit area 233 based on data of the position of the light emitting unit area 233 stored in a memory (e.g., the memory 130 of FIG. 1). The data of the position of the light emitting unit area 233 may include data of coordinates of at least one pixel corresponding to the light emitting unit area 233 and/or the light receiving unit area 232 of the optical sensor 310 among the pixels 231 of the display 230. The position data of the light emitting unit area 233 may be acquired by 'acquiring the coordinates of the light emitting unit area 233' to be described in FIG. 6.

In an embodiment, the visual object may include the image of various types. In an embodiment, the visual object may include a two-dimensional shape (e.g., a circle, a donut, a polygon, an atypical) or a three-dimensional shape (e.g., a sphere, a cube) of various types. For example, the visual object may include an object including various shapes or their combination. In an embodiment, the visual object may include not only a static image but also a dynamic image. In an embodiment, the dynamic image may include an image having the shape which varies based on time. In an embodiment, the dynamic image may include an image which appears and disappears at time intervals. In an embodiment, the visual object may include an image which appears and disappears on a periodic basis. In an embodiment, the visual object may include an image having various visual effects such as hologram.

Referring to FIG. 4B, a visual object 410 according to an embodiment may include a text relating to an operation of the optical sensor 310. For example, if the optical sensor 310 is a proximity sensor, the processor may display the visual object 410 including a text "proximity sensor is operating" while the light emitting unit 312 of the proximity sensor is operating. A phase of the text included in the visual object 410 is not limited thereto.

Referring to FIG. 4C, a visual object 420 in an embodiment may have a shape which is equal to or wider than the light emitting unit area 233. In an embodiment, the electronic device may determine a position for displaying the visual object on the display, wherein the distortion of the spot type in the light emitting unit area 233 overlaps the visual object 420. The disclosure is not limited to the overlapping of the light emitting unit area 233 and the visual object 420, and the visual object in an embodiment may have a shape (e.g., a ring shape) spaced from the light emitting unit area 233 and surrounding the light emitting unit area 233. The visual object 420 may include a single color or various colors. At least one of the position, the shape or the color of the visual object 420 may change based on time. For example, the visual object 420 may be a ring-shaped object which rotates around the light emitting unit area 233.

If the optical sensor 310 including the light emitting unit 312 is disposed in the rear surface of the display 230, an unintended spot may occur in the light emitting unit area 233 of the display 230 due to the light radiated from the light emitting unit 312. According to an embodiment, the processor may output a visual object related to an operation of the optical sensor 310 in the light emitting unit area 233 and/or an area adjacent to the light emitting unit area 233, thus improving the usability of the display 230. The user of the electronic device may recognize the visual object 410 and 420 displayed in the light emitting unit area 233 and/or the area adjacent to the light emitting unit area 233, and thus understand that the spot on the display 230 due to the operation of the light emitting unit 312 is a normal operation of the electronic device.

For example, the processor may periodically drive the proximity sensor to identify whether the electronic device and the user get close to each other while a call application is running. As the light emitting unit of the proximity sensor radiates the infrared light, an unintended spot may occur in the light emitting unit area 233 of the display. The processor may display a visual object related to the operation of the proximity sensor together with a user interface of the call application, in the light emitting unit area 233 while the proximity sensor operates.

According to an embodiment, operation 401 and operation 402 may be carried out together. For example, the processor may activate the proximity sensor 310 (operation 401) and concurrently output the visual object in the light emitting unit area 233 or the area adjacent to the light emitting unit area 233 (operation 402).

Figure 5:
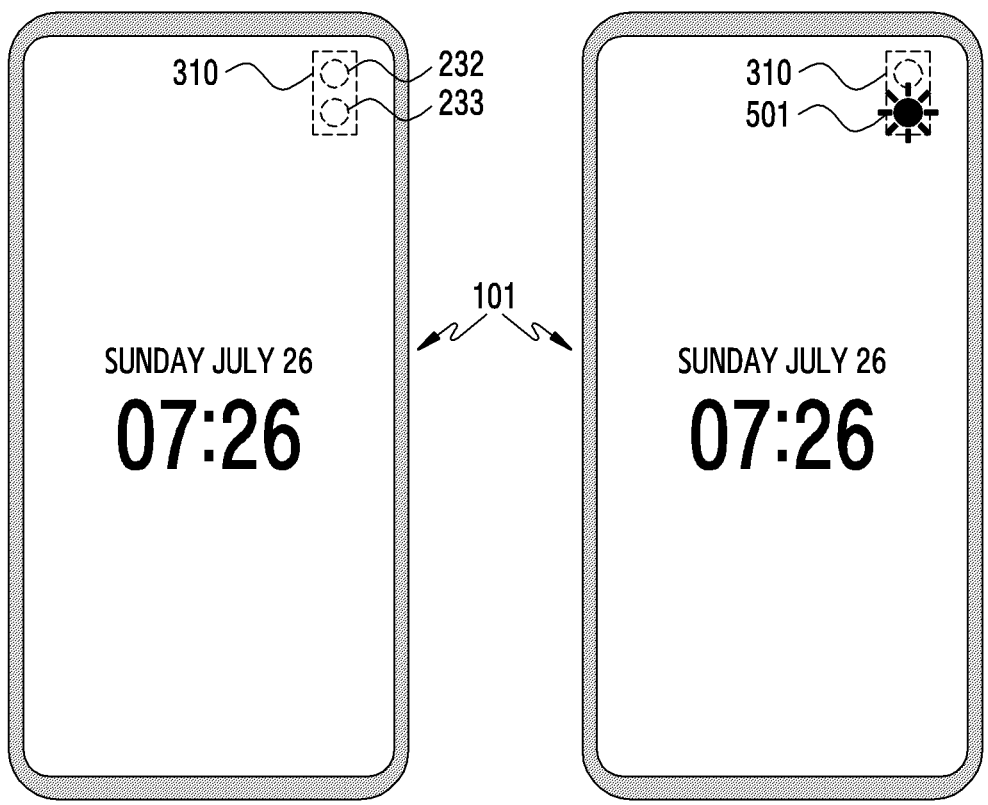
FIG. 5 is a diagram illustrating example operations for providing a notification service using a light emitting unit of an optical sensor in an electronic device according to various embodiments.

FIG. 5 is a diagram illustrating example operations of providing a notification service using a light emitting unit 312 of an optical sensor 310 in an electronic device (e.g., the electronic device 101 of FIG. 1) according to various embodiments, which shall be described with reference to FIG. 3.

If the light radiated from the light emitting unit 312 of the optical sensor 310 disposed in the rear surface of the display 230 reaches the display 230, the corresponding light may generate a spot 501 in the area (e.g., the light emitting unit area 233) of the optical sensor 310 of the display 230. The processor of the electronic device according to an embodiment may generate the spot 501 in the display 230 by controlling the light emitting unit 312 of the optical sensor 310 regardless of the operation of the optical sensor 310, and provide the user with various information by use of the spot 501 in the display 230.

In an embodiment, the electronic device may visually provide various information through the display by controlling the light emitting unit 312 of the optical sensor 310. In an embodiment, the information provided by the electronic device by controlling the light emitting unit 312 may include status information of the electronic device. According to an embodiment, while a battery of the electronic device receives power from an external electronic device, the processor may display the power supply on the display 230 by activating the light emitting unit 312 of the optical sensor 310. For example, the processor may generate a flickering spot 501 by periodically activating the light emitting unit 312 of the proximity sensor based on detecting that the electronic device is charging. The spot 501 periodically flickering may notify the user of the charging state of the electronic device.

In an embodiment, the status of the electronic device provided from the electronic device to the user by controlling the light emitting unit 312 may include a status change of an application stored in a memory (e.g., the memory 130 of FIG. 1) of the electronic device. In an embodiment, the status change of the application may correspond to presence or absence of a new notification. The application is in a first state in response to the new notification, and the application is in a second state in response to no new notification. In an embodiment, based on determining new notification in the application, the electronic device may control the light emitting unit 312 to notify the new notification to the user. According to an embodiment, the processor may control the light emitting unit 312 of the optical sensor 310 to notify the user of a new incoming message. For example, if the user is watching a video in a full screen mode and a message is received, the new incoming message may be notified to the user by generating the spot 501 on the display 230 using the light emitting unit 312 of the optical sensor 310.

According to an embodiment, the processor may adjust a pattern of the spot 501 on the display 230, by adjusting a radiation pattern of the light emitting unit 312. By controlling the radiation pattern based on a type of the notification, the processor may notify the notification type to the user. The processor may control the spot 501 to flicker faster on the display 230 by reducing the operation interval of the light emitting unit 312, or control the spot 501 to flicker slower on the display 230 by increasing the operation interval of the light emitting unit 312. The processor may adjust sharpness of the spot 501 by controlling the number of pulses or a pulse length of the light emitting unit 312.

For example, if the electronic device is charging, the processor may control the light emitting unit 312 to continuously radiate the light, to thus continuously display the spot 501 on the display 230. If the electronic device receives a message, the processor may control the light emitting unit 312 to generate the spot 501 in a different pattern from the charging, to notify the user of the incoming message.

Figure 6:
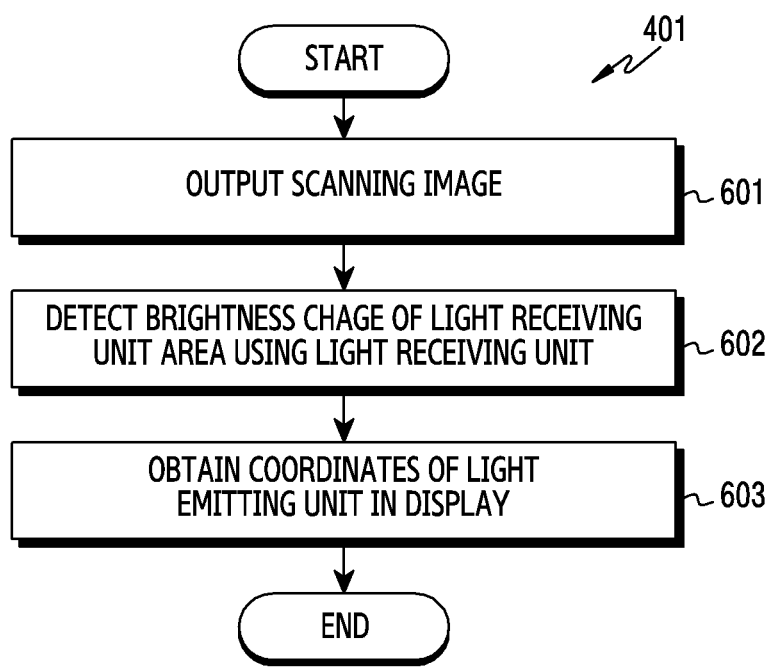
FIG. 6 is a flowchart illustrating an example method of acquiring coordinates of an area corresponding to a light emitting unit of an optical sensor in a display of an electronic device according to various embodiments.

FIG. 6 is a flowchart illustrating an example method of acquiring position information (e.g., coordinates) of an area corresponding to a light emitting unit (e.g., the light emitting unit 312 of FIG. 3) of a display in an electronic device (e.g., the electronic device 101 of FIG. 1) according to various embodiments. Operations of FIG. 6 may be included in operation 401 of FIG. 4A, which may be described with reference to FIG. 3.

According to an embodiment, in operation 601, a processor (e.g., the processor 120 of FIG. 1) of the electronic device may output through the display 230 an image (hereafter, a 'scanning image') which moves over part or whole of the display 230, to acquire the position information of the area corresponding to the optical sensor 310 in the display 230.

According to an embodiment, the processor may output a plurality of scanning images through the display 230. For example, the processor may acquire first coordinate information of the optical sensor 310 area using a first scanning image, and acquire second coordinate information of the optical sensor 310 area using a second scanning image.

According to an embodiment, while the scanning image is output, a background screen distinguished from the scanning image may be output in other area than the scanning image in the display 230. The scanning image may have a color and/or a brightness distinguished from the background screen. For example, the scanning image may be white, and the background screen may be black.

According to an embodiment, the scanning image may have a line of a first pixel thickness (hereafter, a '1-pixel line'). The 1-pixel line may be a vertical line or a horizontal line crossing the display 230. For example, in the display 230 of a n×m pixel matrix, the 1-pixel line of the i-th row may be a set of pixels corresponding to [i, 1], [i, 2], . . . [i, m]. For example, the 1-pixel line of the j-th column may be a set of pixels corresponding to [1, j], [2, j], . . . [n, j]. In this case, the background screen may include pixels excluding the pixels of the 1-pixel line, and the pixels of the background screen may radiate the light distinguished from the 1-pixel line.

According to an embodiment, the scanning image may move in a designated direction based on time. For example, the scanning image may be a vertical line which moves in the horizontal direction. For example, the scanning image may be a horizontal line which moves in the vertical direction. If the processor outputs a plurality of scanning images, the moving directions of the scanning images may be different from one another. For example, if a first scanning image moves in a first direction, a second scanning image may move in a second direction which is different from the first direction.

According to an embodiment, the area passed by the scanning image may include at least the light receiving unit area 232. The processor may output the scanning image in an area expected to include the optical sensor 310 in the display 230. Since the position of the optical sensor 310 is preset in the electronic device and a position variation of the optical sensor 310 in the manufacturing or assembling process is quite smaller than the area of the display 230, the processor may output the scanning image which passes only some area of the display 230, and thus efficiently acquire the coordinates of the light emitting unit area 233 in operation 603 to be explained.

According to an embodiment, the processor may temporarily increase the brightness of the display 230 while outputting the scanning image. After the scanning image is completely output, the processor may recover the brightness of the display 230 to the level before the scanning image output. If the brightness of the display 230 increases, the brightness of the scanning image also increases and a brightness difference between the scanning image and the background screen may increase. For example, if the scanning image is output together with the black background screen, the scanning image is brightened as the display 230 is brightened but the brightness of the black background screen has no change. Hence, the brightness difference between the scanning image and the background screen may increase. By temporarily increasing the brightness of the display 230 while outputting the scanning image, the processor may relatively precisely identify the coordinates of the area corresponding to the light emitting unit 312 of the optical sensor 310 in the display 230, in operation 603.

In operation 602, the processor may detect the brightness change of the light receiving unit area 232 of the optical sensor 310 in the display 230, using the light receiving unit 311 of the optical sensor 310.

According to an embodiment, some of the light emitted from the display 230 may also reach the light receiving unit 311 of the optical sensor 310 disposed in the rear surface of the display 230. The light receiving unit 311 of the optical sensor 310 may gather the light 320 radiated from the light receiving unit area 232 in the display 230 and thus generate an electrical signal related to the brightness of the light receiving unit area 232. The processor may obtain the electrical signal related to the brightness of the light receiving unit area 232 through the light receiving unit 311 of the optical sensor 310, and detect the brightness change of the light receiving unit area 232 based on the obtained electrical signal.

For example, if the scanning image which passes the light receiving unit area 232 has a first brightness and the background screen has a second brightness which is different from the first brightness, the processor may detect the brightness change of the light receiving unit area 232 through the light receiving unit 311 in order of the second brightness, the first brightness, and the second brightness while the scanning image passes the light receiving unit area 232.

According to an embodiment, based on the brightness change of the light receiving unit area 232 due to the movement of the scanning image, the processor may identify coordinates of the area (hereafter, the light emitting unit area 233) corresponding to the light emitting unit 312 of the optical sensor 310 in the display 230, in operation 603.

According to an embodiment, the processor may acquire coordinate information of the light receiving unit area 232, based on the coordinate information of the scanning image and the brightness change obtained through the light receiving unit 311 of the optical sensor 310. The processor may identify a timing at which the brightness of the light receiving unit area 232 obtained through the light receiving unit 311 is maximum, and identify the coordinate information of the scanning image at the identified timing. The coordinate information of the scanning image at the timing of the maximum brightness of the light receiving unit area 232 may correspond to the coordinate information of the light receiving unit area 232.

For example, if the scanning image is a 1-pixel vertical line which moves in the horizontal direction (the x-axis direction) and the processor detects the maximum brightness at a first timing through the light receiving unit 311, the x coordinate of the 1-pixel vertical line at the first timing may be the x coordinate of the area corresponding to the light receiving unit 311 in the display 230. Likewise, if the scanning image is a 1-pixel horizontal line which moves in the vertical direction (the y-axis direction) and the processor detects the maximum brightness at a second timing through the light receiving unit 311, the y coordinate of the 1-pixel horizontal line at the second timing may be the y coordinate of the area corresponding to the light receiving unit 311 in the display 230.

According to an embodiment, the processor may acquire coordinates of the light emitting unit area 233 in the display 230, based on manufacture information of the optical sensor 310 including the coordinates of the light receiving unit area 232 in the display 230 and the position relation between the light emitting unit 312 and the light receiving unit 311. Since the position of the light emitting unit 312 with respect to the light receiving unit 311 of the optical sensor 310 is designated mostly at the manufacture phase of the optical sensor 310, the coordinates of the area corresponding to the light emitting unit 312 may be identified, by identifying the coordinates of the area corresponding to the light receiving unit 311.

Figure 7A:
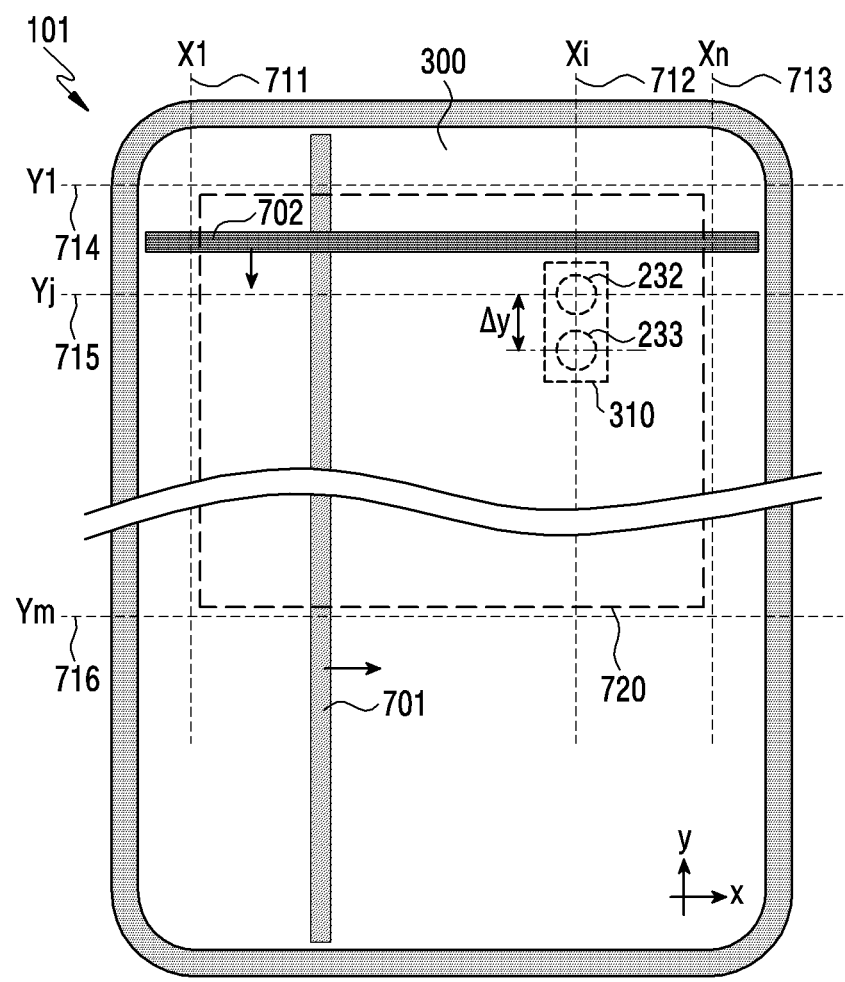
FIG. 7A is a diagram illustrating an example scanning image displayed on a display of an electronic device according to various embodiments.
Figure 7B:
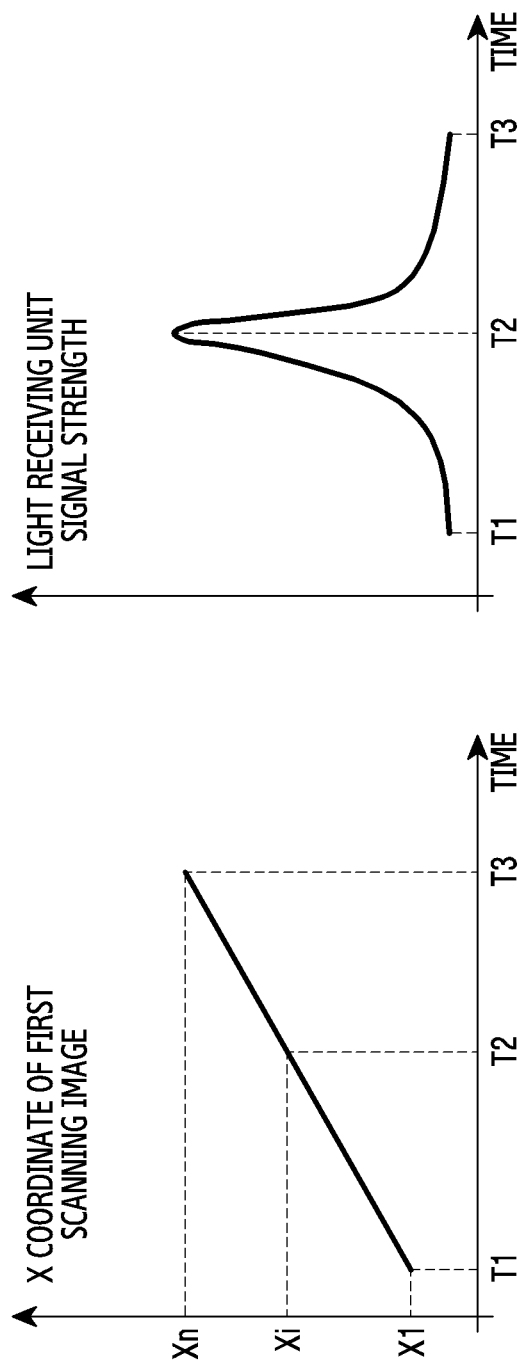
FIG. 7B are graphs illustrating examples of movement of a scanning image and brightness change of a light receiving unit area based on time in the display of the electronic device according to various embodiments.
Figure 7C:
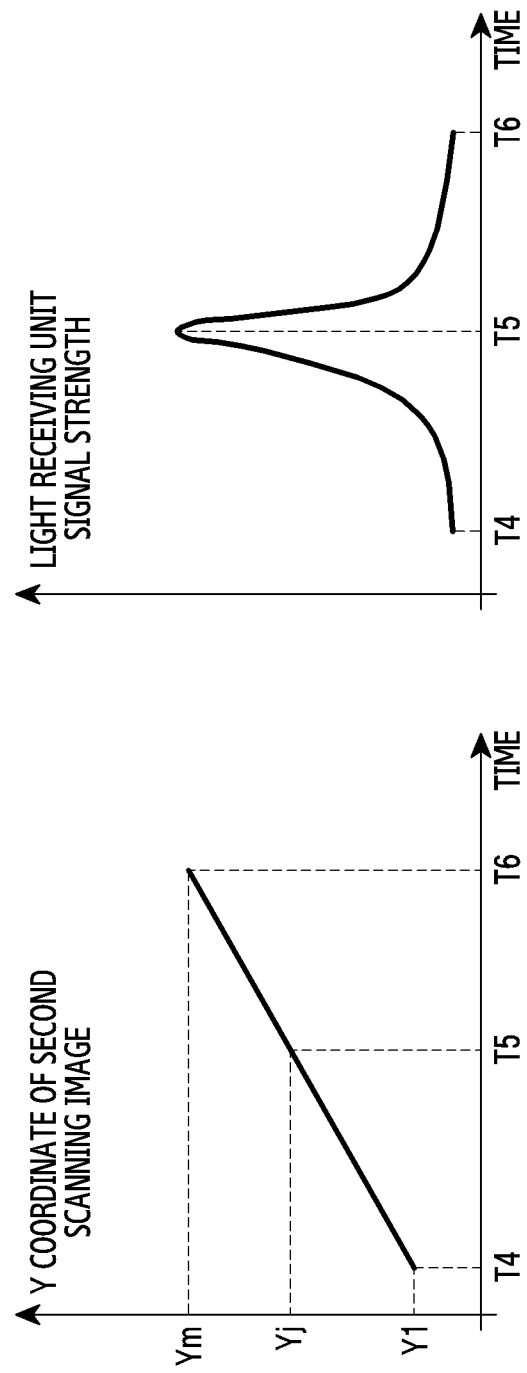
FIG. 7C are graphs illustrating examples of the movement of the scanning image and the brightness change of the light receiving unit area based on time in the display of the electronic device according to various embodiments.

FIG. 7A is a diagram illustrating an example scanning image displayed on a display (e.g., the display 160 of FIG. 1) of an electronic device (e.g., the electronic device 101 of FIG. 1) according to various embodiments. FIG. 7B and FIG. 7C are graphs illustrating examples of movement of a scanning image and brightness change of a light receiving unit area (e.g., the light receiving unit area 232 of FIG. 3) based on time in the display (e.g., the display 160 of FIG. 1) of the electronic device (e.g., the electronic device 101 of FIG. 1) according to various embodiments. In the following, descriptions are provided with reference to FIG. 3.

Referring to FIG. 7A and FIG. 7B, a processor (e.g., the processor 120 of FIG. 1) may output a first scanning image 701 (or a first image) and a second scanning image 702 (or a second image) through the display 230. According to an embodiment, the first scanning image 701 may be a vertical line which is parallel to the y axis in a designated thickness (e.g., the thickness of a single pixel), and the second scanning image 702 may be a horizontal line which is parallel to the x axis in a designated thickness. The first scanning image 701 may move to the right (in the +x direction), and the second scanning image 702 may move to the left (in the −y direction). The first scanning image 701 may be displayed on a first line 711 at a first timing T1, on a second line 712 at a second timing T2, on a third line 713 at a third timing T3. The second scanning image 702 may be displayed on a fourth line 714 at a fourth timing T4, on a fifth line 715 at a fifth timing T5, on a sixth line 716 at a sixth timing T6. An area 720 surrounded by the first line 711, the third line 713, the fourth line 714 and the sixth line 716 may include at least the light receiving unit area 232 in the display 230. According to an embodiment, since the position of the optical sensor 310 in the electronic device may be approximately acquired at the manufacture phase of the electronic device, the area 720 displaying the scanning images 701 and 702 may correspond to the optical sensor 310, for example, an area expected to include the light receiving unit 311 of the optical sensor 310. In an embodiment, the area 720 displaying the scanning image may include the area where the optical sensor 310 is mounted. For example, the area 720 displaying the scanning image may include the light receiving unit area 232 and the light emitting unit area 233.

Referring to FIG. 7A and FIG. 7B, the x coordinate of the first scanning image 701 may be X1 at the first timing T1, Xi at the second timing T2, and Xn at the third timing T3. While the first scanning image 701 displayed on the first line 711 moves to the third line 713, the processor may detect a signal strength change acquired through the light receiving unit 311 of the optical sensor 310. For example, the signal strength of the light receiving unit 311 may increase if the first scanning image 701 moves from the first line 711 to the second line 712, and the signal strength of the light receiving unit 311 may decrease if the first scanning image 701 moves from the second line 712 to the third line 713. The processor may identify the maximum signal strength of the light receiving unit 311 at the second timing T2, and acquire the x coordinate Xi of the first scanning image 701 at the second timing T2. The x coordinate of the first scanning image 701 at the second timing T2 may correspond to the x coordinate of the area corresponding to the light receiving unit 311 of the optical sensor 310 on the display 230.

Referring to FIG. 7A and FIG. 7C, the y coordinate of the second scanning image 702 may be Y1 at the fourth timing T4, Yj at the fifth timing T5, and Ym at the sixth timing T6. While the second scanning image 702 displayed on the fourth line 714 moves to the sixth line 716, the processor may detect a signal strength change acquired through the light receiving unit 311 of the optical sensor 310. For example, the signal strength of the light receiving unit 311 may increase if the second scanning image 702 moves from the fourth line 714 to the fifth line 715, and the signal strength of the light receiving unit 311 may decrease if the second scanning image 702 moves from the fifth line 715 to the sixth line 716. The processor may identify the maximum signal strength of the light receiving unit 311 at the fifth timing T5, and acquire the y coordinate Yj of the second scanning image 702 at the fifth timing T5. The y coordinate of the second scanning image 702 at the fifth timing T5 may correspond to the y coordinate of the area corresponding to the light receiving unit 311 of the optical sensor 310 on the display 230.

According to an embodiment, the processor may obtain the x coordinate and the y coordinate of the light receiving unit area 232 in the display 230, and thus obtain the coordinates of the light emitting unit area 233 in the display 230. Referring to FIG. 7A, since the light emitting unit 312 of the optical sensor 310 is spaced by Δy in the −y direction, compared to the light receiving unit 311 of the optical sensor 310, the processor may identify the coordinates (Xi, Yj−Δy) of the area corresponding to the light emitting unit 312.

According to an embodiment, if the optical sensor 310 may be a light sensor, the electronic device may adjust the brightness of the display 230 based on a brightness or a color of light displayed in an area corresponding to the light sensor in the display 230. If the light sensor is disposed in the rear surface of the display 230, an illuminance value measured by the light sensor may vary due to the light from the display 230 although the illuminance of the incident light to the front surface of the electronic device is consistent. Since the electronic device adjusts the brightness of the display 230 based on the illuminance value acquired through the light sensor, if the light sensor is disposed in the rear surface of the display 230, the brightness of the display 230 may not match the ambient light intensity.

According to an embodiment, the processor may compensate for the illuminance value measured by the light sensor or the brightness of the display 230, based on the brightness or the color of the light emitted from some area of the display 230 corresponding to the light sensor.

According to an embodiment, to precisely compensate for the illuminance value, the processor may identify an accurate position of the area corresponding to the light sensor in the display 230. The processor may identify the accurate position of the area corresponding to the light sensor in the display 230, and adjust the brightness of the display 230 based on at least one of the color or the brightness of the light output from the display 230 panel of the corresponding area.

According to an embodiment, if the optical sensor 310 may be a fingerprint sensor, the processor may precisely identify an area corresponding to the fingerprint sensor in the display 230, and provide a user interface related to the fingerprint recognition based on the identified area. The electronic device may precisely display an area to be touched by a user's finger on the display 230, thus enhancing accuracy of the fingerprint recognition.

Figure 8:
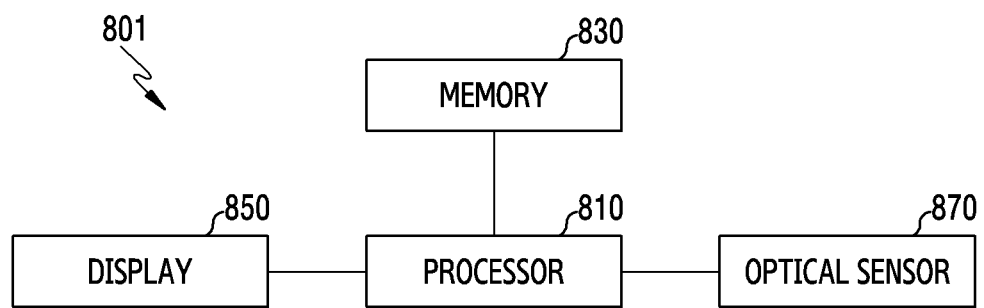
FIG. 8 is a block diagram illustrating an example electronic device according to various embodiments.

FIG. 8 is a block diagram illustrating an example electronic device 801 according to various embodiments. Referring to FIG. 8, the electronic device 801 may include a processor (e.g., including processing circuitry) 810, a display 850, an optical sensor 870, and a memory 830.

In an embodiment, the electronic device 801 of FIG. 8 may be the electronic device 101 of FIG. 1. In an embodiment, the processor 801 may be the processor 120 of FIG. 1, and carry out the operations of FIG. 4A. In an embodiment, the optical sensor 870 may be the optical sensor 310 of FIG. 3. In an embodiment, the display 850 may be the display 230 of FIG. 3.

In an embodiment, the electronic device 801 (or the processor 810) of FIG. 8 may be an entity which performs the operations of FIG. 4A and FIG. 6. In an embodiment, the electronic device 801 of FIG. 8 may implement the embodiment of FIG. 4B, FIG. 4C, FIG. 5, and FIG. 7A.

The processor 810 may include various processing circuitry and execute an application stored in the memory 830 to control the memory 830, the display 850, or the optical sensor 870 connected to the processor 810. In an embodiment, the processor 810 may output an image through the display 850. The processor 810 may identify a position of the optical sensor 870 using the optical sensor 870. The processor 810 may determine a position of a visual object to be output on the display 850, using position information of the optical sensor 870 stored in the memory 830. The processor 810 may display the visual object in an area corresponding to a light emitting unit of the optical sensor 870, thus minimizing usability degradation due to the operation of the light emitting unit of the optical sensor 870.

The optical sensor 870 may include a light receiving unit including various light receiving circuitry and the light emitting unit including various light emitting circuitry. The optical sensor 870 may gather ambient light through the light receiving unit, or radiate light through the light emitting unit. For example, a proximity sensor may radiate infrared light to the electronic device front surface through the light emitting unit, and detect the infrared light reflected from an external object through the light receiving unit. The optical sensor 870 may be used for the processor 810 to identify the position of the optical sensor 870. If the processor 810 outputs a moving image, the processor 810 may monitor a signal change of the optical sensor 870 due to the corresponding image, using the light receiving unit of the optical sensor 870. The processor 810 may obtain a position of the image at the greatest signal strength or the greatest signal strength change of the optical sensor 870, wherein the position information of the image at the timing may correspond to the position information of the optical sensor 870.

The display 850 is connected to the processor 810 and may output an image based on an instruction of the processor 810. In an embodiment, the processor 810 may display a scanning image to acquire the position information of the optical sensor 870. The scanning image may move over some or whole of the display 850. The processor 840 may output a visual object in the area of the display 850 corresponding to the position of the optical sensor 870. The area corresponding to the light emitting unit of the optical sensor 870 in the display 850 may be subject to distortion due to the light radiated from the light emitting unit. In an embodiment, by displaying the visual object in the corresponding area, the electronic device may enable the user to recognize that the display 850 operates normally in spite of the distortion in the display 850.

The memory 830 may include instructions related to the operations of the electronic device, may be connected to the processor 810, and may provide the instructions of the processor 810. For example, the memory 830 may store the position information of the optical sensor 870. For example, the memory 830 may store coordinate data related to the area corresponding to the light receiving unit or the area corresponding to the light emitting unit of the optical sensor 870 in the display 850. The processor 810 may display a visual object in the area corresponding to the position of the optical sensor 870, using the position information of the optical sensor 870 stored in the memory 830.

According to an example embodiment, an electronic device (e.g., the electronic device 101 of FIG. 1) may include: a display (e.g., the display 230 of FIG. 3), an optical sensor (e.g., the optical sensor 310 of FIG. 3) disposed in a rear surface of the display and overlapping the display, the optical sensor including a light emitting unit including light emitting circuitry (e.g., the light emitting unit 312 of FIG. 3) and a light receiving unit including light receiving circuitry (e.g., the light receiving unit 311 of FIG. 3), a processor (e.g., the processor 120 of FIG. 1) operatively connected with the display and the optical sensor, and a memory (e.g., the memory 130 of FIG. 1) operatively connected with the processor, wherein the memory may store instructions which, when executed, cause the processor to obtain position information of a first area (e.g., the light emitting unit area 233 of FIG. 3) corresponding to the light emitting unit of the optical sensor in the display, and based on the light emitting unit of the optical sensor radiating light, output a visual object in the first area and/or an area adjacent to the first area on the display.

According to an example embodiment, the instructions, when executed, may cause the processor to: output at least one movable image (e.g., the scanning image 701 and 702 of FIG. 7A) through the display, detect a light brightness change caused by movement of the at least one image through the light receiving unit based on the at least one image moving, and obtain position information of the first area based on the light brightness change, wherein an area in which the at least one image moves may overlap at least the light receiving unit.

According to an example embodiment, the instructions, when executed, may cause the processor to change brightness of the display to a designated value based on outputting the at least one image.

According to an example embodiment, the instructions, when executed, may cause the processor to output the visual object through the display based on an operation pattern of the optical sensor.

According to an example embodiment, the visual object of the electronic device may include a text or a shape related to an operation of the optical sensor.

According to an example embodiment, the instructions, when executed, may cause the processor to provide status information of the electronic device through the display by controlling the optical sensor.

According to an example embodiment, the information of the electronic device may indicate that the electronic device receives power from an external power supply device.

According to an example embodiment, the information of the electronic device may indicate that a new message is received in a message application.

According to an example embodiment, the optical sensor of the electronic device may include a sensor configured to measure illuminance through the light receiving unit, wherein the instructions, when executed, may cause the processor to: obtain data related to the illuminance through the light receiving unit, and adjust the brightness of the display based at least on the illuminance data and properties of a light output from an area corresponding to the light receiving unit in the display.

According to an example embodiment, the optical sensor of the electronic device may include a fingerprint sensor, wherein the instructions, when executed, may cause the processor to provide a visual object related to an operation of the fingerprint sensor based on the position information of the first area.

According to an example embodiment, a method of controlling an electronic device including a display and an optical sensor may include: obtaining position information of a first area corresponding to a light emitting unit of the optical sensor in the display, and based on the light emitting unit of the optical sensor radiating light, outputting a visual object in the first area and/or an area adjacent to the first area on the display.

According to an example embodiment, the method may further include: outputting at least one movable image through the display, detecting a light brightness change caused by movement of the at least one image through the light receiving unit of the optical sensor based on the at least one image moving, and obtaining position information of the first area, based on the light brightness change.

According to an example embodiment, the method may further include outputting the visual object through the display based on an operation pattern of the optical sensor.

According to an example embodiment, the visual object of the method may include a text or a shape related to an operation of the optical sensor.

According to an example embodiment, the method may further include providing status information of the electronic device through the display by controlling the optical sensor, wherein the information may indicate that a new image is received in a message application.

According to an example embodiment, an electronic device may include: a display, a proximity sensor disposed in a rear surface of the display and overlapping the display, and including a light emitting unit including light emitting circuitry and a light receiving unit including light receiving circuitry, a processor operatively connected with the display and the proximity sensor, and a memory operatively connected with the processor, wherein the memory may store instructions which, when executed, cause the processor to: based on the light emitting unit of the proximity sensor radiating light, output a visual object in at least one of a first area or an area adjacent to the first area on the display.

According to an example embodiment, the instructions, when executed, may cause the processor to: output at least one movable image through the display, obtain position information of the first area corresponding to the light emitting unit of the proximity sensor in the display, detect a light brightness change caused by movement of the at least one image through the light receiving unit based on the at least one image moving, and obtain position information of the first area based on the light brightness change.

According to an example embodiment, the instructions, when executed, may cause the processor to change brightness of the display to a designated value based on outputting the at least one image.

According to an example embodiment, the instructions, when executed, may cause the processor to output the visual object through the display based on an operation pattern of the proximity sensor.

According to an example embodiment, the instructions, when executed, may cause the processor to provide status information of the electronic device through the display by controlling the proximity sensor, wherein the information may indicate that a new message is received in a message application.

Various example embodiments of the disclosure may accurately identify a position of an optical sensor disposed in a rear surface of a display, and thus provide a visual object related to an operation of the optical sensor in an area corresponding to the optical sensor. Various example embodiments of the disclosure may improve usability of an electronic device by providing the visual object related to the optical sensor in an area including distortion due to the optical sensor in the display.

The methods according to the embodiments described in the claims or the specification of the disclosure may be implemented in software, hardware, or a combination of hardware and software.

As for the software, a computer-readable storage medium storing one or more programs (software modules) may be provided. One or more programs stored in the computer-readable storage medium may be configured for execution by one or more processors of an electronic device. One or more programs may include instructions for controlling the electronic device to execute the methods according to the embodiments described in the claims or the specification of the disclosure.

Such a program (software module, software) may be stored to a random access memory, a non-volatile memory including a flash memory, a read only memory (ROM), an electrically erasable programmable ROM (EEPROM), a magnetic disc storage device, a compact disc (CD)-ROM, digital versatile discs (DVDs) or other optical storage devices, and a magnetic cassette. Alternatively, it may be stored to a memory combining part or all of those recording media. A plurality of memories may be included.

Also, the program may be stored in an attachable storage device accessible via a communication network such as Internet, Intranet, local area network (LAN), wide LAN (WLAN), or storage area network (SAN), or a communication network by combining these networks. Such a storage device may access a device which executes an embodiment of the disclosure through an external port. In addition, a separate storage device on the communication network may access the device which executes an embodiment of the disclosure.

In the various example embodiments of the disclosure, the elements included in the disclosure are expressed in a singular or plural form. However, the singular or plural expression is appropriately selected according to a proposed situation for the convenience of explanation, the disclosure is not limited to a single element or a plurality of elements, the elements expressed in the plural form may be configured as a single element, and the elements expressed in the singular form may be configured as a plurality of elements.

While the disclosure has been described with reference to various example embodiments, it will be understood that the various embodiments are intended to be illustrative, not limiting. It will be further understood by those of ordinary skill in the art that various changes in form and detail may be made without departing from the true spirit and full scope of the disclosure, including the appended claims and their equivalents.

What is claimed is:

1. An electronic device comprising:
a display;
an optical sensor disposed in a rear surface of the display and overlapping the display, the optical sensor comprising a light emitter including light emitting circuitry and a light receiver including light receiving circuitry;
a processor operatively connected with the display and the optical sensor and configured to drive the light emitter of optical sensor in accordance with a first signal and to drive the display in accordance with a second signal separate from the first signal; and
a memory operatively connected with the processor,
wherein the memory stores instructions which, when executed, cause the processor to:
obtain position information of a first area, corresponding to the light emitter of the optical sensor, on the display,
while the light emitter of the optical sensor radiates light in accordance with the first signal, control the display in accordance with the second signal to output a visual object in at least one of the first area or an area adjacent to the first area on the display.

2. The electronic device of claim 1, wherein the instructions, when executed, cause the processor to:
output at least one movable image through the display,
detect a light brightness change, caused by movement of the at least one image, through the light receiver, based on the at least one image moving, and
obtain the position information of the first area based on the light brightness change,
wherein an area in which the at least one image moves overlaps at least the light receiver.

3. The electronic device of claim 2, wherein the instructions, when executed, cause the processor to:
change brightness of the display to a designated value based on outputting the at least one image.

4. The electronic device of claim 1, wherein the instructions, when executed, cause the processor to:
output the visual object through the display based on an operation pattern of the optical sensor.

5. The electronic device of claim 1, wherein the visual object comprises a text or a shape related to an operation of the optical sensor.

6. The electronic device of claim 1, wherein the instructions, when executed, cause the processor to:
provide status information of the electronic device through the display by controlling the optical sensor.

7. The electronic device of claim 6, wherein the status information indicates that the electronic device receives power from an external power supply device.

8. The electronic device of claim 6, wherein the status information indicates that a new message is received in a message application.

9. The electronic device of claim 1, wherein the optical sensor comprises a sensor configured to measure illuminance through the light receiver,
wherein the instructions, when executed, cause the processor to:
obtain data related to the illuminance through the light receiver, and
adjust the brightness of the display based at least on the illuminance data and properties of light output from an area corresponding to the light receiver in the display.

10. The electronic device of claim 1, wherein the optical sensor comprises a fingerprint sensor,
wherein the instructions, when executed, cause the processor to:
provide a visual object related to an operation of the fingerprint sensor based on the position information of the first area.

11. A method of controlling an electronic device comprising a display and an optical sensor comprising a light emitter including light emitting circuitry and a light receiver including light receiving circuitry, the method comprising:
obtaining position information of a first area, corresponding to the light emitter of the optical sensor, on the display;
drive the light emitter of the optical sensor in accordance with a first signal;
while the light emitter of the optical sensor radiates light in accordance with the first signal, outputting a visual object in accordance with a second signal, separate from the first signal, in at least one of the first area or an area adjacent to the first area on the display.

12. The method of claim 11, further comprising:
outputting at least one movable image through the display;
detecting a light brightness change, caused by movement of the at least one image, through the light receiver of the optical sensor, based on the at least one image moving; and
obtaining the position information of the first area based on the light brightness change.

13. The method of claim 11, further comprising:
outputting the visual object through the display based on an operation pattern of the optical sensor.

14. The method of claim 11, wherein the visual object comprises a text or a shape related to an operation of the optical sensor.

15. The method of claim 11, further comprising:
providing status information of the electronic device through the display by controlling the optical sensor,
wherein the status information indicates that a new message is received in a message application.

16. An electronic device comprising:
a display;
a proximity sensor disposed in a rear surface of the display and overlapping the display, the proximity sensor comprising a light emitter including light emitting circuitry and a light receiver including light receiving circuitry;
a processor operatively connected with the display and the proximity sensor and configured to drive the light emitter of the optical sensor in accordance with a first signal and to drive the display in accordance with a second signal separate from the first signal; and
a memory operatively connected with the processor,
wherein the memory stores instructions which, when executed, cause the processor to:
while the light emitter of the proximity sensor radiates light in accordance with the first signal, control the display in accordance with the second signal to output a visual object in at least one of a first area or an area adjacent to the first area on the display.

17. The electronic device of claim 16, wherein the instructions, when executed, cause the processor to:
output at least one movable image through the display,
obtain position information of the first area, corresponding to the light emitter of the proximity sensor, on the display,
detect a light brightness change, caused by movement of the at least one image, through the light receiver, based on the at least one image moving, and
obtain position information of the first area based on the light brightness change.

18. The electronic device of claim 17, wherein the instructions, when executed, cause the processor to:
change brightness of the display to a designated value based on outputting the at least one image.

19. The electronic device of claim 16, wherein the instructions, when executed, cause the processor to:
output the visual object through the display based on an operation pattern of the proximity sensor.

20. The electronic device of claim 16, wherein the instructions, when executed, cause the processor to:
provide status information of the electronic device through the display by controlling the proximity sensor,
wherein the status information indicates that a new message is received in a message application.

\* \* \* \* \*